United States Patent
Jaradi et al.

(10) Patent No.: US 11,491,948 B2
(45) Date of Patent: Nov. 8, 2022

(54) PILLAR-SUPPORTED AIRBAG FOR EXTENDING VEHICLE SEAT

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US); Anil Kalra, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/003,341

(22) Filed: Aug. 26, 2020

(65) Prior Publication Data
US 2022/0063546 A1   Mar. 3, 2022

(51) Int. Cl.
*B60R 21/2334*   (2011.01)
*B60R 21/213*   (2011.01)
*B60R 21/231*   (2011.01)
*B60R 21/16*   (2006.01)
*B60R 21/264*   (2006.01)

(52) U.S. Cl.
CPC ........ *B60R 21/2334* (2013.01); *B60R 21/213* (2013.01); *B60R 21/23184* (2013.01); *B60R 21/264* (2013.01); *B60R 2021/161* (2013.01); *B60R 2021/23161* (2013.01)

(58) Field of Classification Search
CPC .......... B60R 21/2334; B60R 21/23184; B60R 21/213; B60R 2021/161
See application file for complete search history.

(56) References Cited

U.S. PATENT DOCUMENTS

| | | | |
|---|---|---|---|
| 3,795,412 A | 3/1974 | John | |
| 5,462,308 A * | 10/1995 | Seki | B60R 21/08 280/730.2 |
| 5,845,935 A * | 12/1998 | Enders | B60R 21/2338 280/730.2 |
| 8,087,690 B2 | 1/2012 | Kim | |
| 8,967,661 B2 * | 3/2015 | Mueller | B60R 21/213 280/730.2 |
| 9,321,423 B2 | 4/2016 | Jaradi et al. | |
| 9,327,669 B2 | 5/2016 | Jaradi et al. | |
| 9,333,934 B2 * | 5/2016 | Sitko | B60R 21/2338 |
| 9,744,932 B1 | 8/2017 | Faruque et al. | |
| 9,789,840 B2 * | 10/2017 | Farooq | B60R 21/214 |
| 9,902,362 B2 * | 2/2018 | Farooq | B60N 2/14 |
| 9,994,182 B1 * | 6/2018 | Jaradi | B60R 21/232 |
| 11,214,222 B2 * | 1/2022 | Bertossi | B60R 21/21 |
| 2021/0101556 A1 * | 4/2021 | Jaradi | B60R 21/205 |
| 2021/0394702 A1 * | 12/2021 | Farooq | B60R 21/214 |

* cited by examiner

*Primary Examiner* — James A English
*Assistant Examiner* — Joselynn Y Sliteris
(74) *Attorney, Agent, or Firm* — Frank A. MacKenzie; Bejin Bieneman PLC

(57) ABSTRACT

An assembly for a vehicle includes a vehicle floor and a vehicle roof spaced from the vehicle floor. A pillar extends from the vehicle floor to the vehicle roof. The assembly includes an airbag supported by the pillar. The airbag is inflatable from the pillar from an uninflated position to an inflated position. The assembly includes a seat supported by the vehicle floor adjacent the pillar. The airbag extends around the seat when in the inflated position.

20 Claims, 8 Drawing Sheets

PILLAR-SUPPORTED AIRBAG FOR EXTENDING VEHICLE SEAT

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate during the operation of the vehicle. This may allow the occupants of the seats to face each other and to interact. This may also allow all of the occupants to relax, interact with one another, and focus on vehicle amenities. There remains an opportunity to design vehicle amenities for the occupants that takes into account the reduced operation monitoring provided by the autonomous vehicle.

DETAILED DESCRIPTION

Figure 1:
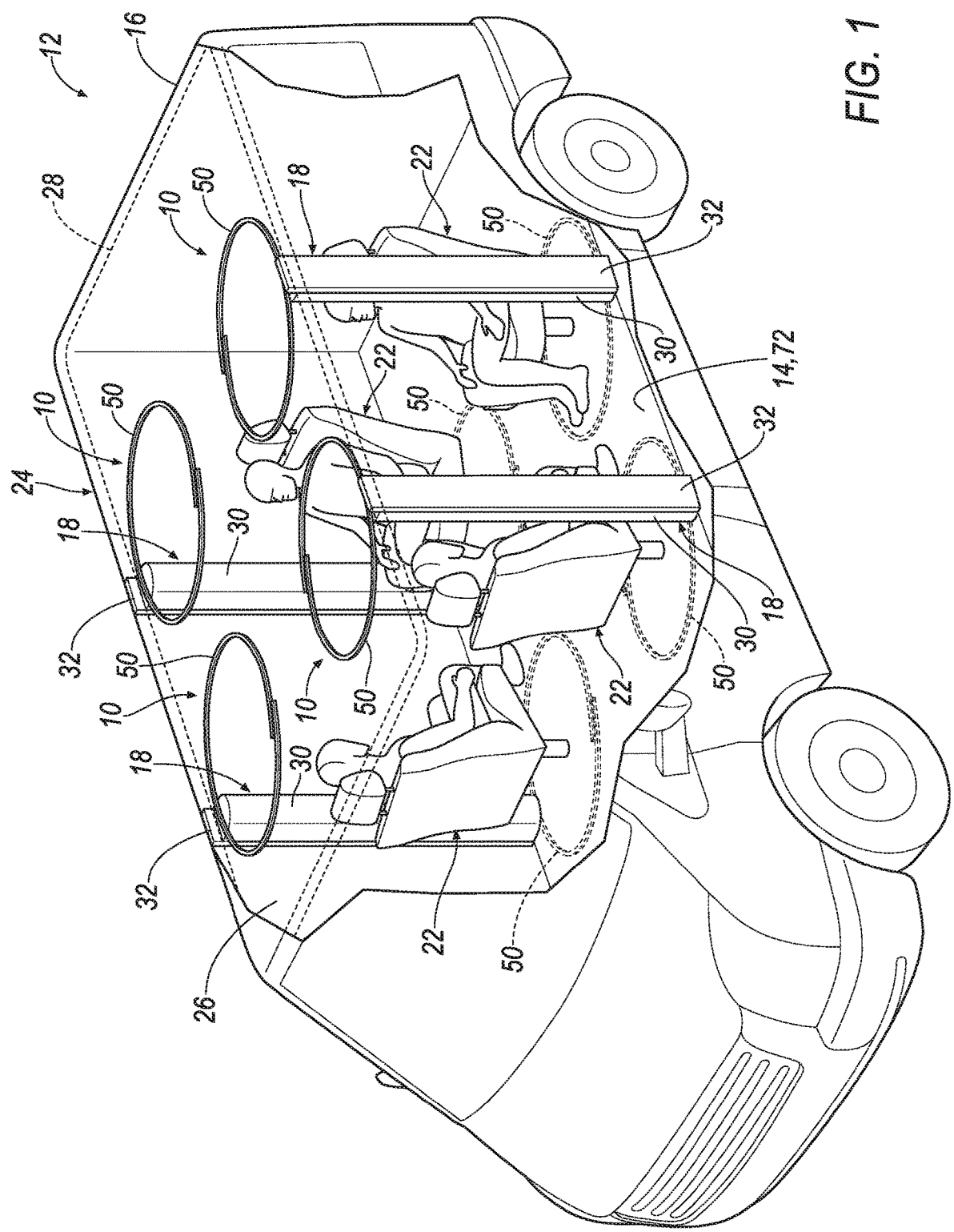
FIG. 1 is a perspective view of a vehicle having assemblies including airbags in an uninflated position supported by pillars of the vehicle.

An assembly includes a vehicle floor and a vehicle roof spaced from the vehicle floor. The assembly includes a pillar extending from the vehicle floor to the vehicle roof. The assembly includes an airbag supported by the pillar, the airbag being inflatable from the pillar from an uninflated position to an inflated position. The assembly includes a seat supported by the vehicle floor adjacent the pillar, the airbag extending around the seat when in the inflated position.

At least one of the vehicle roof or the vehicle floor may include a track, the airbag being engaged with and movable along the track.

The airbag may include a vehicle-forward portion and a vehicle-rearward portion opposite the vehicle-forward portion, the vehicle-forward portion being movable along the track in an opposite direction of the vehicle-rearward portion.

The vehicle-forward and the vehicle-rearward portions each may have ends distal to the pillar, the ends overlapping each other when the airbag is in the inflated position.

The track may include a vehicle-forward segment and a vehicle-rearward segment, the vehicle-forward portion of the airbag being engaged with and movable along the vehicle-forward segment and the vehicle-rearward portion of the airbag being engaged with and movable along the vehicle-rearward segment.

The assembly may include a pyrotechnic device connected to the airbag, the airbag being movable along the track by the pyrotechnic device.

The assembly may include a slider connected to the airbag, the slider engaged with and movable along the track.

The seat may be rotatable about a rotational axis and the track is curved about the rotational axis.

The airbag may encircle the seat in the inflated position.

The airbag may be slidably engaged with at least one of the vehicle roof or the vehicle floor.

The airbag has a generally cylindrical shape around the seat when in the inflated position.

The airbag may include a vehicle-forward portion and a vehicle-rearward portion opposite the vehicle-forward portion, the vehicle-forward portion being inflatable from an opposite direction from the vehicle-rearward portion around the seat.

The vehicle-forward portion and the vehicle-rearward portion each may have an end distal to the pillar, the ends overlapping each other when the airbag is in the inflated position.

The pillar may include a trim panel and a body panel, the airbag being disposed between the trim panel and the body panel in the uninflated position.

The vehicle roof and the vehicle floor each may include a track, the airbag being engaged with and movable along the tracks.

Each track may include a vehicle-forward segment and a vehicle-rearward segment spaced from each other, and the airbag includes a vehicle-forward portion engaged with and movable along the vehicle-forward segments and a vehicle-rearward portion engaged with and movable along the vehicle-rearward segments.

The vehicle-forward and the vehicle-rearward portions of the airbag each may have ends distal to the pillar, the ends overlapping each other when the airbag is in the inflated position.

The assembly may include a pyrotechnic device at the vehicle floor and connected to the airbag, the airbag being movable along the track of the vehicle floor by the pyrotechnic device.

With reference to the Figures, wherein like numerals indicate like parts throughout the several views, an assembly 10 for a vehicle 12 includes a vehicle floor 14 and a vehicle roof 16 spaced from the vehicle floor 14. A pillar 18 extends from the vehicle floor 14 to the vehicle roof 16. The assembly 10 includes an airbag 20 supported by the pillar 18. The airbag 20 is inflatable from the pillar 18 from an uninflated position to an inflated position. The assembly 10 includes a seat 22 supported by the vehicle floor 14 adjacent the pillar 18. The airbag 20 extends around the seat 22 when in the inflated position.

In the event of an impact to the vehicle 12, the airbag 20 inflates away from the pillar 18. As the airbag 20 inflates, the airbag 20 extends around the seat 22 and an occupant that may be in the seat 22. The airbag 20 controls the kinematics of the occupant by extending around the seat 22. In an example where the seat 22 is rotatable, the seat 22 and occupant may position the seat to face in one of a plurality of directions. In the event of an impact to the vehicle 12, the airbag 20 extends around the seat 22 regardless of the direction the seat 22 and occupant are facing and controls the kinematics of the occupant in the seat 22. Specifically, the airbag 20 controls the kinematics of the occupant in scenarios in which the occupant is buckled to the seat 22 and in scenarios in which the occupant is unbuckled relative to the seat 22.

The vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The vehicle, for example, may be an autonomous vehicle. In other words, the vehicle 12 may be autonomously operated such that the vehicle 12 may be driven without constant attention from a driver, i.e., the vehicle 12 may be self-driving without human input.

Figure 2:
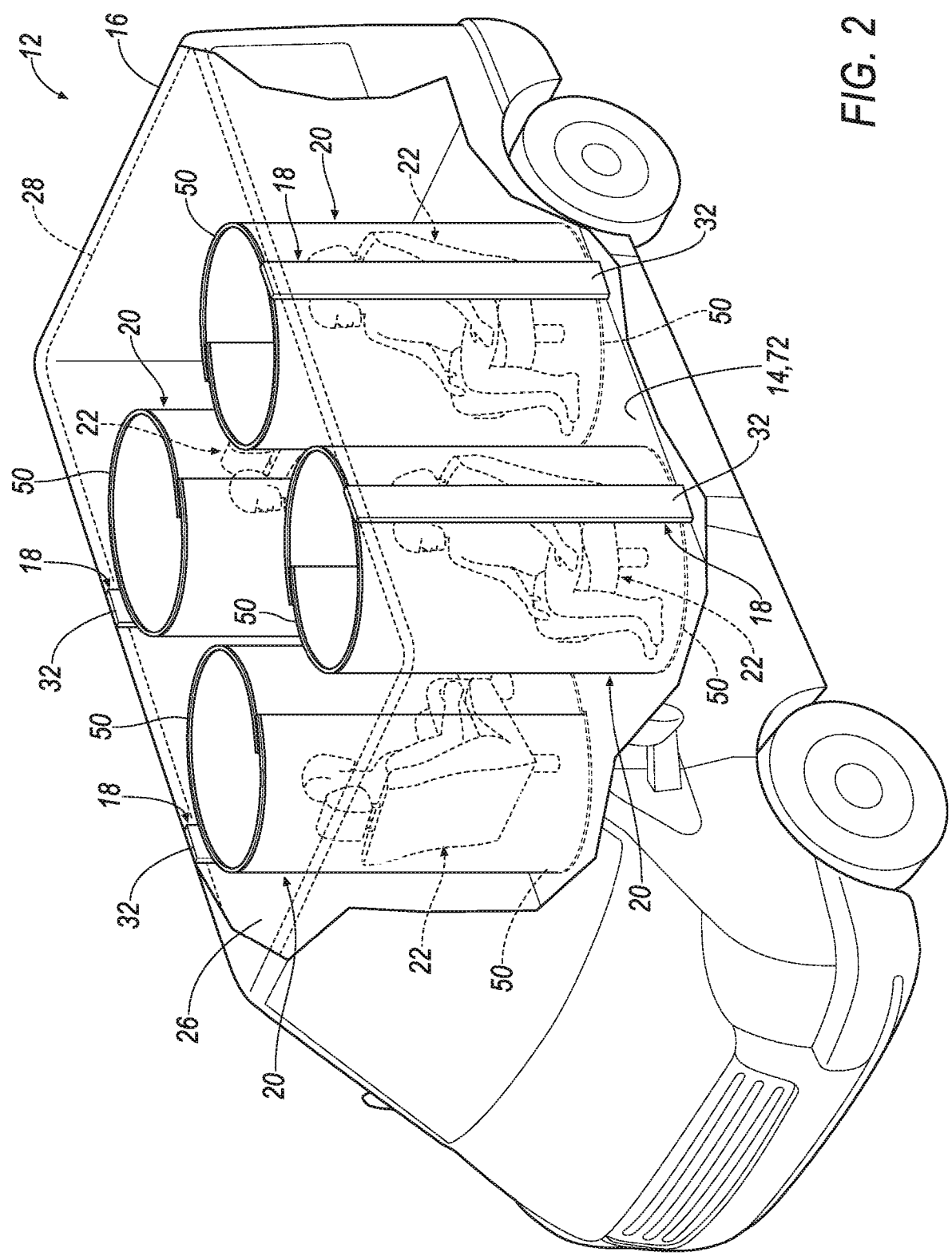
FIG. 2 is a perspective view of the vehicle with the airbags in an inflated position and surrounding seats of the vehicle.

With reference to FIGS. 1 and 2, the vehicle 12 includes a body 24. The body 24 may be of a unibody construction. In the unibody construction, the body 24, e.g., rockers, serves as a vehicle frame, and the body 24 (including the rockers, pillars, roof rails, etc.) is unitary, i.e., a continuous one-piece unit. As another example, the body 24 and frame may have a body-on-frame construction (also referred to as a cab-on-frame construction). In other words, the body 24 and frame are separate components, i.e., are modular, and the body 24 is supported on and affixed to the frame. Alternatively, the body 24 may have any suitable construction. The body 24 may be formed of any suitable material, for example, steel, aluminum, etc.

The body 24 may define a passenger cabin 26 to house occupants, if any, of the vehicle. The passenger cabin 26 may extend across the vehicle, i.e., from one side to the other side of the vehicle. The passenger cabin 26 includes a front end and a rear end with the front end being in front of the rear end during forward movement of the vehicle.

The body 24 includes the vehicle floor 14. The vehicle floor 14 may define the lower boundary of the passenger cabin 26 and may extend from the front end of the passenger cabin 26 to the rear end of the passenger cabin 26. The vehicle floor 14 may include a floor panel and upholstery on the vehicle floor 14. The upholstery may be, for example, carpet 72, and may have a class-A surface facing the passenger cabin 26, i.e., a surface specifically manufactured to have a high quality, finished, aesthetic appearance free of blemishes. The vehicle floor 14 may include cross-beams (not shown) connected to the panel and to other components of the body 24.

The body 24 includes the vehicle roof 16. The vehicle roof 16 is spaced from the vehicle floor 14. The vehicle roof 16 may include a panel having outer surface at an exterior of the vehicle 12 and an inner surface facing toward the passenger cabin 26. The vehicle roof 16 may include a roof beam (not shown) adjacent the panel and extending between roof rails of the vehicle.

The vehicle 12 may include a headliner 28 supported by the vehicle roof 16. The headliner 28 may define the upper boundary of the passenger cabin 26 and may extend from the front end of the passenger cabin 26. The headliner 28 may include a class-A surface.

The vehicle body 24 may include pillars 18. For example, as shown in the Figures, the vehicle body 24 may include an A-pillar and a B-pillar on each side of the vehicle. The A-pillars may extend between the windshield and the front doors. In other words, the A-pillars may be disposed at the front end of the passenger cabin 26. The B-pillars may extend behind the front doors, e.g., between adjacent doors. The B-pillars may be spaced from the A-pillars by a front door opening. The vehicle 12 may include additional pillars 18 spaced from each other, e.g., as shown in the Figures, C-pillars, D-pillars. The pillars 18 may extend from the vehicle roof 16 to the vehicle floor 14.

The pillars 18 may include a trim panel 30 and a body panel 32. The trim panel 30 may be attached to the body panel 32. The trim panel 30 may be attached to the body panel 32 in any suitable manner, e.g., threaded fasteners, clips, push-pins, Christmas tree fasteners, etc. The pillars 18 may have a class-A surface, e.g., the trim panel 30 may have a class-A surface.

Figure 3:
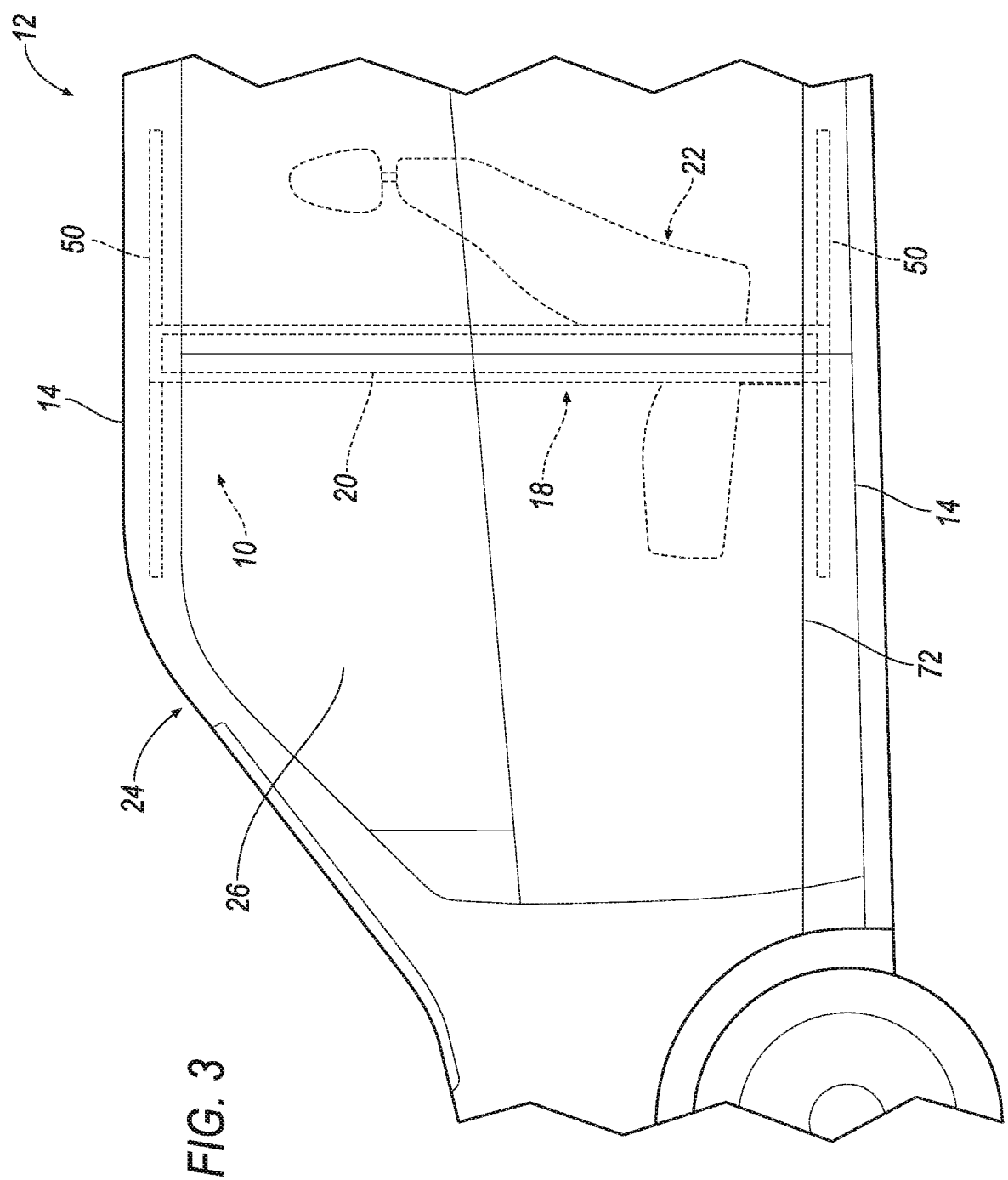
FIG. 3 is a side view of the vehicle with the airbag in the uninflated position.

With reference to FIGS. 1-4 and as set forth above, the vehicle 12 includes at least one seat 22. Specifically, the vehicle 12 may include any suitable number of seats 22. As shown in FIGS. 1, 2, and 3, the seats 22 may be supported by the vehicle floor 14 adjacent any of the pillars 18 in the vehicle. The seats 22 may be arranged in any suitable arrangement in the passenger cabin 26. For example, one or more of the seats 22 may be at the front end of the passenger cabin 26, i.e., a front seat, and/or one or more of the seats 22 may be at the rear end of the passenger cabin 26, i.e., a rear seat. The seats 22 may be movable relative to the vehicle floor 14 to various positions, e.g., movable fore-and-aft and/or cross-vehicle.

Each seat 22 may rotate about a rotational axis A that extends through the vehicle roof 16 and the floor 14. For example, the seat 22 may rotate between a forward-facing position, a rearward-facing position, a rightward-facing position, a leftward-facing position, and/or positions therebetween about the vertical axis. In the forward-facing position, an occupant of the seat 22 faces a front dash. The seat 22 may rotate completely, i.e., 360°, about the rotational axis A. The seat 22 may rotate between fixed positions, e.g., the forward-facing position and the rearward-facing position, or may be rotatable to an infinite number of positions.

The seat 22 may include a seat back 34, a seat bottom 36, and a head restraint 38. The head restraint 38 may be supported by the seat back 34 and may be stationary or movable relative to the seat back 34. The seat back 34 may be supported by the seat bottom 36 and may be stationary or movable relative to the seat bottom 36. The seat back 34, the seat bottom 36, and/or the head restraint 38 may be adjustable in multiple degrees of freedom. Specifically, the seat back 34, the seat bottom 36, and/or the head restraint 38 may themselves be adjustable, in other words, adjustable components within the seat back 34, the seat bottom 36, and/or the head restraint 38, and/or may be adjustable relative to each other.

The seat 22 may include a base 40 mounted to the vehicle floor 14 and the seat bottom 36. The base 40 may support the seat bottom 36. In the example shown in the Figures, the base 40 may be a pedestal 40 extending from the seat bottom 36 to the vehicle floor 14. In one example, the pedestal 40 may be fixed to the vehicle floor 14. In another example, the pedestal 40 may move relative to the vehicle floor 14 to allow the seat 22 to move relative to the vehicle floor 14. The rotational axis A may extend through the pedestal 40, i.e., the seat 22 rotates about the pedestal 40 to difference facing positions.

The assembly 10 includes an airbag assembly (not numbered). The airbag assembly includes an inflator 42 and the airbag 20. The airbag assembly may include a housing. The housing may provide a reaction surface for the airbag 20 in the inflated position. The housing may be supported by the body panel 32 of the pillar 18. The housing may be of any material, e.g., a rigid polymer, a metal, a composite, etc.

The inflator 42 is connected to the airbag 20. Upon receiving a signal from, e.g., a computer, the inflator 42 inflates the airbag 20 with an inflatable medium, such as a gas. The inflator 42 may be, for example, a pyrotechnic inflator that uses a chemical reaction to drive inflation medium to the airbag 20. The inflator 42 may be of any suitable type, for example, a cold-gas inflator.

Figure 4:
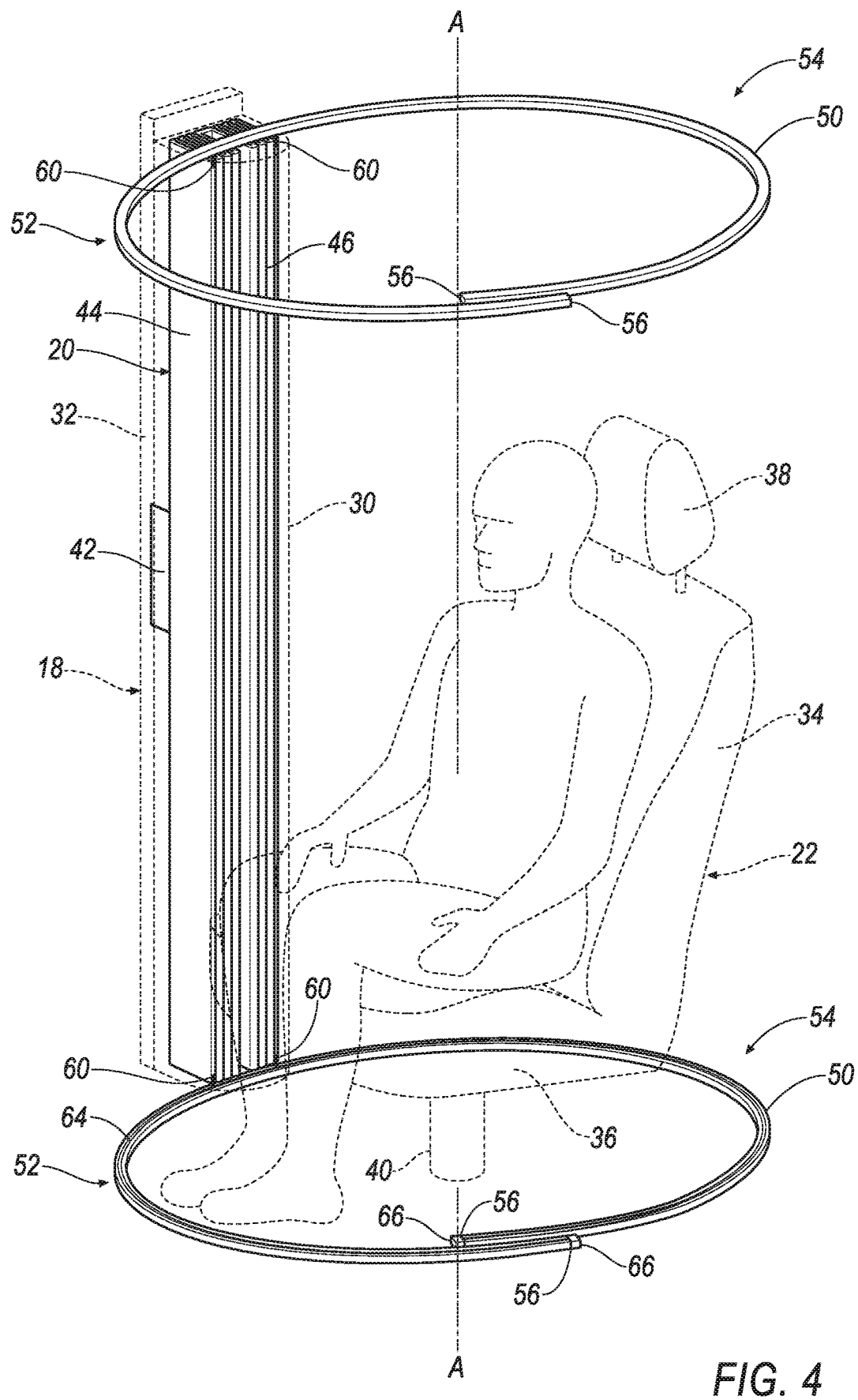
FIG. 4 is a perspective view of the assembly including tracks, the airbag being in the uninflated position.

As shown in FIGS. 1 and 4, the airbag assembly is supported by the pillar 18. Specifically, the airbag 20 is supported by the pillar 18. The airbag 20 is inflatable from the pillar 18 from the uninflated position to the inflated position. The airbag 20 may be fixed to the pillar 18 in any suitable manner, e.g., fasteners, clips, etc. The airbag 20 may be disposed between the trim panel 30 and the body panel 32 of the pillar 18 in the uninflated position. Specifically, the airbag 20 may be fixed to the body panel 32 of the pillar 18.

In one example, in the event of an impact to the vehicle, the trim panel 30 may release from the body panel 32 to allow the airbag 20 to inflate to the inflated position. In another example, the trim panel 30 may include tear seams that release in the event of an impact to the vehicle 12 to allow the airbag 20 to inflate to the inflated position.

The airbag 20 may be formed of a woven polymer or any other material. As one example, the airbag 20 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 5:
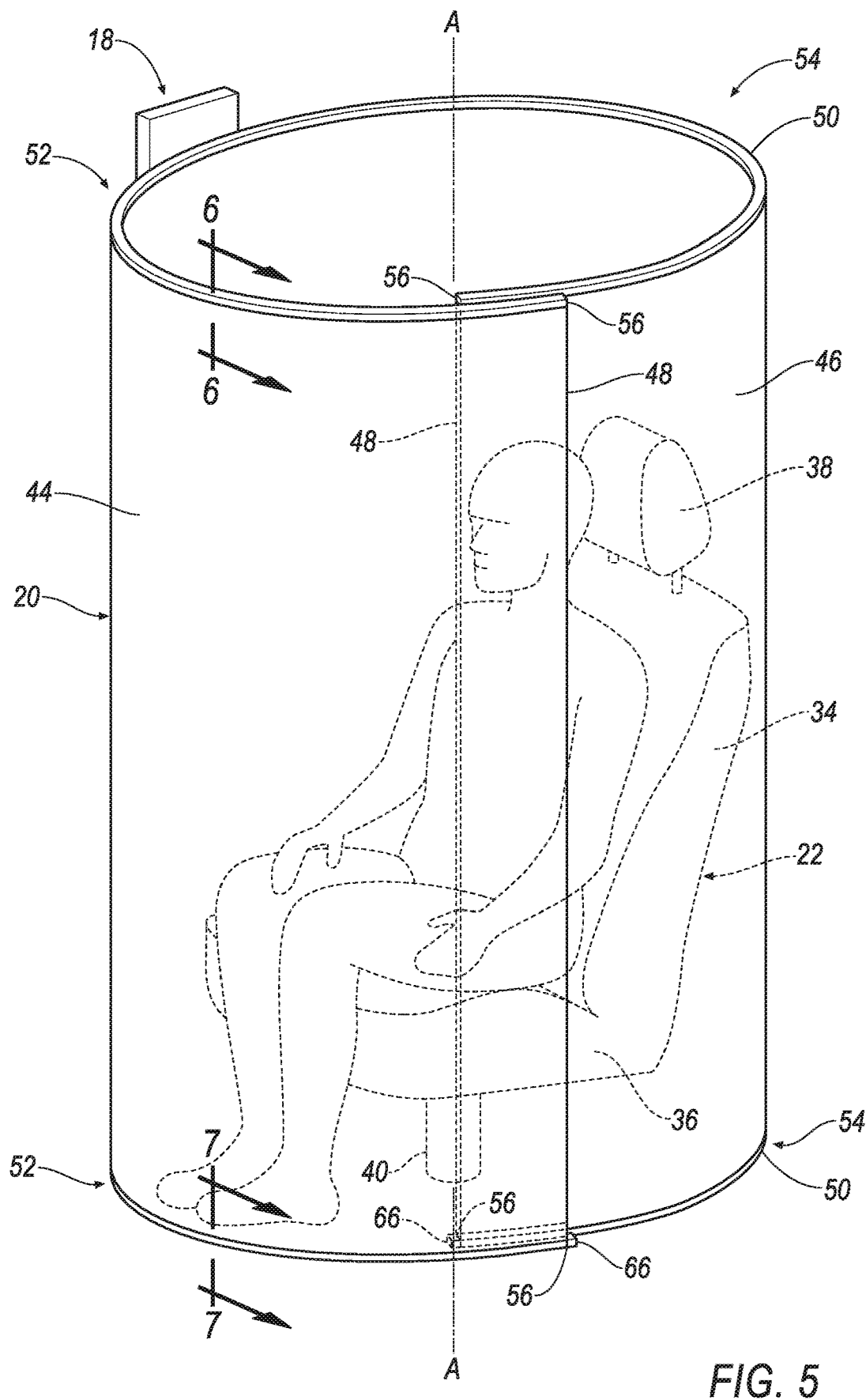
FIG. 5 is a perspective view of the assembly with the airbag in the inflated position.
Figure 6:
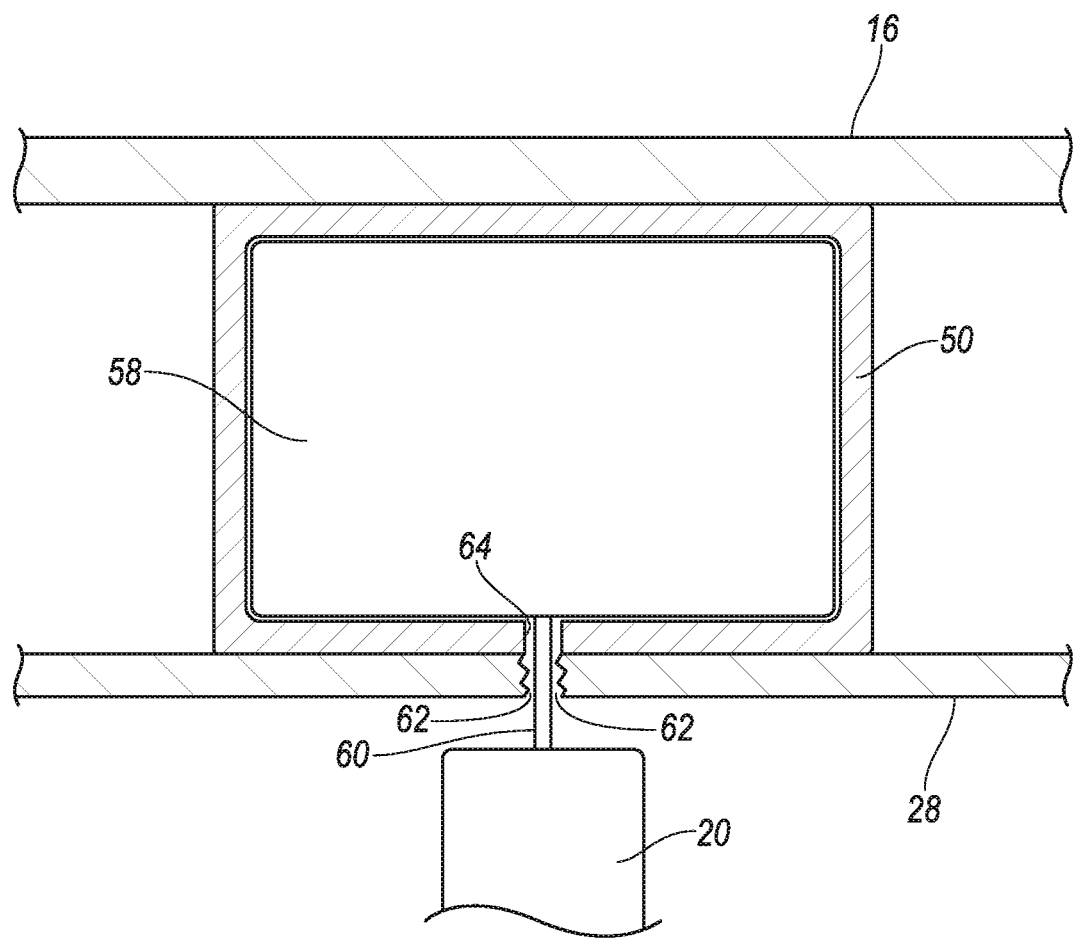
FIG. 6 is a cross-sectional view through line 6 in FIG. 5.

As shown in FIGS. 2 and 5, in the inflated position, the airbag 20 extends around the seat 22. Specifically, the airbag 20 may encircle the seat 22, i.e., extend endlessly around the seat 22, in the inflated position. In such an example, the kinematics of the occupant are controlled in all directions when the airbag 20 is in the inflated position because the airbag 20 completely surrounds the seat 22 and the occupant. The airbag 20 may include two inflatable portions 44, 46 that overlap to encircle the seat 22, as described further below. Specifically, the inflatable portions 44, 46 overlap such that the kinematics of the occupant are controlled in all directions when the airbag 20 is in the inflated position. The two inflatable portions 44, 46 overlap each other by extending past each other in opposite directions.

As shown in FIGS. 2 and 5, the airbag 20 may have a generally cylindrical shape around the seat 22 when in the inflated position. The cylindrical shape has an axis that extends through the vehicle roof 16 and the vehicle floor 14. In the example shown in the Figures and as described further below, the inflatable portions 44, 46 overlap to complete the cylindrical shape in the inflated position.

As discussed above, the airbag 20 may include one or more inflatable portions 44, 46. For example, as shown in the Figures, the airbag 20 may include a vehicle-forward portion 44 and a vehicle-rearward portion 46. The vehicle-rearward portion 46 is opposite the vehicle-forward portion 44 both in the uninflated and the inflated positions. In other words, the vehicle-rearward portion 46 and the vehicle-forward portion 44 oppose each other about the rotational axis A of the seat 22. In the uninflated position, the vehicle-forward portion 44 may extend toward the front end of the passenger cabin 26 and the vehicle-rearward portion 46 may extend toward the rear end of the passenger cabin 26. Specifically, the vehicle-forward portion 44 may be inflatable from an opposite direction from the vehicle-rearward portion 46 around the seat 22. In the inflated position, the vehicle-forward portion 44 may extend around the seat 22 vehicle-forward of the seat 22 and the vehicle-rearward portion 46 may extend around the seat 22 vehicle-rearward of the seat 22.

In one example, as shown in the Figures, the airbag 20 may be a single airbag supported by the pillar 18. In such an example, the vehicle-forward portion 44 and the vehicle-rearward portion 46 may be continuous with each other and the vehicle-forward portion 44 and the vehicle-rearward portion 46 are fluidly and physically connected to one another. In such an example, the airbag 20 may be inflated by a single inflator common to both the vehicle-forward portion 44 and the vehicle-rearward portion 46. The vehicle-forward portion 44 and the vehicle-rearward portion 46 may both extend from a common housing.

In another example, the vehicle-forward portion 44 and the vehicle-rearward portion 46 may be separate from each other, i.e., the vehicle-forward portion 44 and the vehicle-rearward portion 46 may be fluidly isolated from each other. In such an example, each of the separate inflatable portions 44, 46 may be inflated with a respective inflator, i.e., a separate inflator may be used to inflate the separate vehicle-forward portion 44 and the vehicle-rearward portion 46 of the airbag 20. As another example, each of the vehicle-forward portion 44 and the vehicle-rearward portion 46 may be inflated by a common inflator.

With reference to FIGS. 1 and 2, the vehicle-forward portion 44 and the vehicle-rearward portion 46 may be curved to extend around the seat 22 when the airbag 20 is in the inflated position. The vehicle-forward portion 44 may extend from the pillar 18 toward the front end of the passenger cabin 26 and curve around the vehicle-forward side of the seat 22 in an inboard direction relative to the pillar 18. The vehicle-rearward portion 46 may extend from the pillar 18 toward the rear end of the passenger cabin 26 and curve around the vehicle-forward side of the seat 22 in the inboard direction relative to the pillar 18. One of vehicle-forward portion 44 or the vehicle-rearward portion 46 may curve from the pillar 18 in a counterclockwise direction around the seat 22 and the other may extend from the pillar 18 in a clockwise direction around the seat 22.

In the inflated position, the vehicle-forward portion 44 and the vehicle-rearward portion 46 of the airbag 20 each extend from the pillar 18 to ends 48 distal to the pillar 18. The vehicle-forward portion 44 and the vehicle-rearward portion 46 curve around the seat 22 from the pillars 18 to the ends 48. The ends 48 may be spaced in the inboard direction in the passenger cabin 26 relative to the pillar 18. The vehicle-forward portion 44 and the vehicle-rearward portion 46 terminate at the respective end 48, i.e., the ends 48 are terminal edges distal-most to the pillar 18.

The airbag 20 may be slidably engaged with at least one of the vehicle roof 16 and the vehicle floor 14. As the airbag 20 inflates to the inflated position, the airbag 20 may slide along the vehicle roof 16 and/or the vehicle floor 14 to guide the airbag 20 into the inflated position around the seat 22. The airbag 20 may continue to slide along the vehicle roof 16 and/or the vehicle floor 14 until the airbag 20 reaches the inflated position, e.g., with the ends 48 overlapping each other. The vehicle-forward portion 44 and the vehicle-rearward portion 46 may abut each other at the ends 48 in the inflated position.

With reference to the Figures, the assembly 10 may include one or more tracks 50 to guide the airbag 20 to the inflated position. Specifically, at least one of the vehicle roof 16 or the vehicle floor 14 may include a track 50. In the example shown in the Figures, both the vehicle roof 16 and the vehicle floor 14 include tracks 50.

With reference to FIGS. 1-5, in an example where the vehicle floor 14 includes the track 50, the track 50 may be positioned under the seat 22 and adjacent the pillar 18. The track 50 may be concealed below the carpet 72. In an example where the vehicle roof 16 includes the track 50, the track 50 may be positioned above the seat 22 and adjacent the pillar 18. The track 50 may be concealed above the headliner 28.

The track 50 may curve relative to the seat 22 so that the airbag 20 extends encircles the seat 22 in the inflated position. Specifically, the tracks 50 may curve about the rotational axis A of the seat 22 to encircle the seat 22. The base 40, e.g., the pedestal 40, of the seat 22 may be positioned generally in the center of the track 50 of the vehicle floor 14 with the track 50 extending around the base 40. The track 50 of the vehicle roof 16 may be a mirror image of the track 50 of the floor 14.

The tracks 50 may include one or more segments extending around the rotational axis A of the seat 22. As in the example shown in the Figures, each track 50 may include a vehicle-forward segment 52 and a vehicle-rearward segment 54 spaced from each other. The vehicle-forward segment 52 may extend toward the front end of the passenger cabin 26 and around the vehicle-forward side of the seat 22. The vehicle-rearward segment 54 may extend toward the rear end of the passenger cabin 26 and around the vehicle-rearward side of the seat 22.

The vehicle-forward segment 52 and the vehicle-rearward segment 54 may each have ends 56 distal to the pillar 18. The vehicle-forward segment 52 and the vehicle-rearward segment 54 may extend from the pillar 18 to ends 56, i.e., the vehicle-forward segment 52 and the vehicle-rearward segment 54 may curve around the rotational axis A of the seat 22 from the pillars 18 to the ends 56 of the vehicle-forward segment 52 and the vehicle-rearward segment 54. The ends 56 of the vehicle-forward segment 52 and the vehicle-rearward segment 54 may be spaced in the inboard direction in the passenger cabin 26 relative to the pillar 18. The ends 56 of the vehicle-forward segment 52 and the vehicle-rearward segment 54 may be terminal ends of the vehicle-forward segment 52 and the vehicle-rearward segment 54, i.e., the vehicle-forward segment 52 and the vehicle-rearward segment 54 do not extend farther than the ends 56.

As shown in the example in the Figures, the vehicle-forward segment 52 and the vehicle-rearward segment 54 may be connected to one other adjacent the pillar 18. In other words, as shown in the Figures, the track 50 may be continuous from the end 56 of the vehicle-forward segment 52 to the end 56 of vehicle-rearward segment 54, i.e., the track 50 is a single piece. In another example, the vehicle-forward segment 52 and the vehicle-rearward segment 54 may be separate from one another adjacent the pillar 18. In other words, the track 50 may discontinuous from the end 56 of the vehicle-forward segment 52 to the end of vehicle-rearward segment 54, i.e., the track 50 may be multiple pieces.

The tracks 50 may guide the airbag 20 to the inflated position. The airbag 20 may be engaged with and be movable along the tracks 50, e.g., the airbag 20 may be engaged with the track 50 in the vehicle roof 16 and/or the track 50 in the vehicle floor 14 of the vehicle. Specifically, the airbag 20 may move along the track 50 as the airbag 20 inflates to the inflated position.

With reference to FIGS. 4-7, the airbag 20 may be slidably engaged with the track 50. As the airbag 20 inflated to the inflated position, the airbag 20 may slide along the track 50 in the vehicle roof 16 and/or the vehicle floor 14 until the airbag 20 reaches the inflated position.

The airbag 20 is slideably engaged with the vehicle floor 14 and the vehicle roof 16. As an example, with reference to FIGS. 6 and 7, the assembly 10 may include a slider 58 connected to the airbag 20 and slideably engaged with the vehicle floor 14 and the vehicle roof 16. In the example shown in FIGS. 6 and 7, the vehicle floor 14 and the vehicle roof 16 both include the track 50 and the sliders 58 are slideably engaged with the track 50. Specifically, each of the ends 48 of the vehicle-forward portion 44 and the vehicle-rearward portion 46 of the airbag 20 may be connected to the slider 58. Each of the sliders 58 moves independently of the other, i.e., as the airbag 20 inflates to the inflated position, the slider 58 connected to end 48 of the vehicle-forward portion 44 of the airbag 20 moves separately from the slider 58 connected to the end 48 of the vehicle-rearward portion 46 of the airbag 20. A tether 60 or any suitable connector may extend between the slider 58 and the airbag 20 to connect the slider 58 to the airbag 20. As the airbag 20 inflates to the inflated position, the sliders 58 move along the vehicle roof 16 and the vehicle floor 14 to guide the airbag 20 to the inflated position. The headliner 28 and/or the carpet 72 may include tear seams 62 that release as the sliders 58 move along the track 50.

The slider 58 connected to the vehicle-forward portion 44 of the airbag 20 is engaged with the vehicle-forward segment 52 of the track 50. The slider 58 connected to the vehicle-rearward portion 46 of the airbag 20 is engaged with the vehicle-rearward segment 54 of the track 50.

As the airbag 20 inflates, the vehicle-forward portion 44 and the vehicle-rearward portion 46 of the airbag 20 may move, e.g., slide, along the vehicle-forward segment 52 and the vehicle-rearward segment 54 of the tracks 50 until the ends 48 of the airbag 20 reach the ends 56 of the track 50. Once the ends 48 of the airbag 20 reach the ends 56 of the track 50, the airbag 20 completely encircles the seat 22 and an occupant that may be in the seat 22. To encircle the seat 22, as shown in the Figures, the ends 56 of the vehicle-forward segment 52 and the vehicle-rearward segment 54 may overlap each other. The ends 56 of the vehicle-forward segment 52 and the vehicle-rearward segment 54 overlapping allows the vehicle-forward portion 44 or the vehicle-rearward portion 46 of the airbag 20 to overlap in the inflated position.

The tracks 50 may include a slot 64 extending from the end 56 of the vehicle-forward segment 52 to the end 56 of the vehicle-rearward segment 54. The airbag 20 may be connected to the slider 58 through the slot 64 in the tracks 50 by a tether 60 or any other suitable connector. The slot 64 may be aligned with the tear seams 62 in the headliner 28 and or the carpet 72. As the airbag 20 inflates to the inflated position, the tear seams 62 may release long the slot 64 such that the slider 58 may move along the track 50 with the airbag 20 being connected to the slider 58 through the slot 64.

As shown in FIG. 5, the assembly 10 may include one or more pyrotechnic devices 66 connected to the airbag 20. The pyrotechnic device 66 may move the airbag 20 from the uninflated position to the inflated position. For example, the pyrotechnic device 66 may move the airbag 20 along the track 50 by the pyrotechnic device 66 to the inflated position. In the event of an impact to the vehicle, the pyrotechnic device 66 is activated to move both the vehicle-forward portion 44 and the vehicle-rearward portion 46 along the track 50 to the inflated position. The assembly 10, for example, may include a pair of pyrotechnic devices 66, e.g., one pyrotechnic device 66 connected to the vehicle-forward portion 44 of the airbag 20 and another pyrotechnic device 66 connected to the vehicle-rearward portion 46 of the airbag 20. As another example, one pyrotechnic device 66 is connected to both the vehicle-forward portion 44 of the airbag 20 and the vehicle-rearward portion 46 of the airbag 20 to simultaneously pull both the vehicle-forward portion 44 and the vehicle-rearward portion 46.

In the example shown in FIG. 5, the pyrotechnic device 66 is positioned at the end 56 of the vehicle-forward segment 52 of the track 50 and a second pyrotechnic device 66 may be positioned at the end 56 of the vehicle-rearward segment 54 of the track 50. The pyrotechnic devices 66 may be connected to the respective sliders 58. The devices 66 may move the sliders 58 along the track 50 toward the ends 56 of the vehicle-forward segment 52 and the vehicle-rearward segment 54 until the sliders 58 reach the ends 56 of the vehicle-forward segment 52 and the vehicle-rearward segment 54. The devices 66 move the ends 48 of the vehicle-forward portion 44 and the vehicle-rearward portion 46 of the airbag 20 while the airbag 20 inflates to the inflated position.

Figure 7:
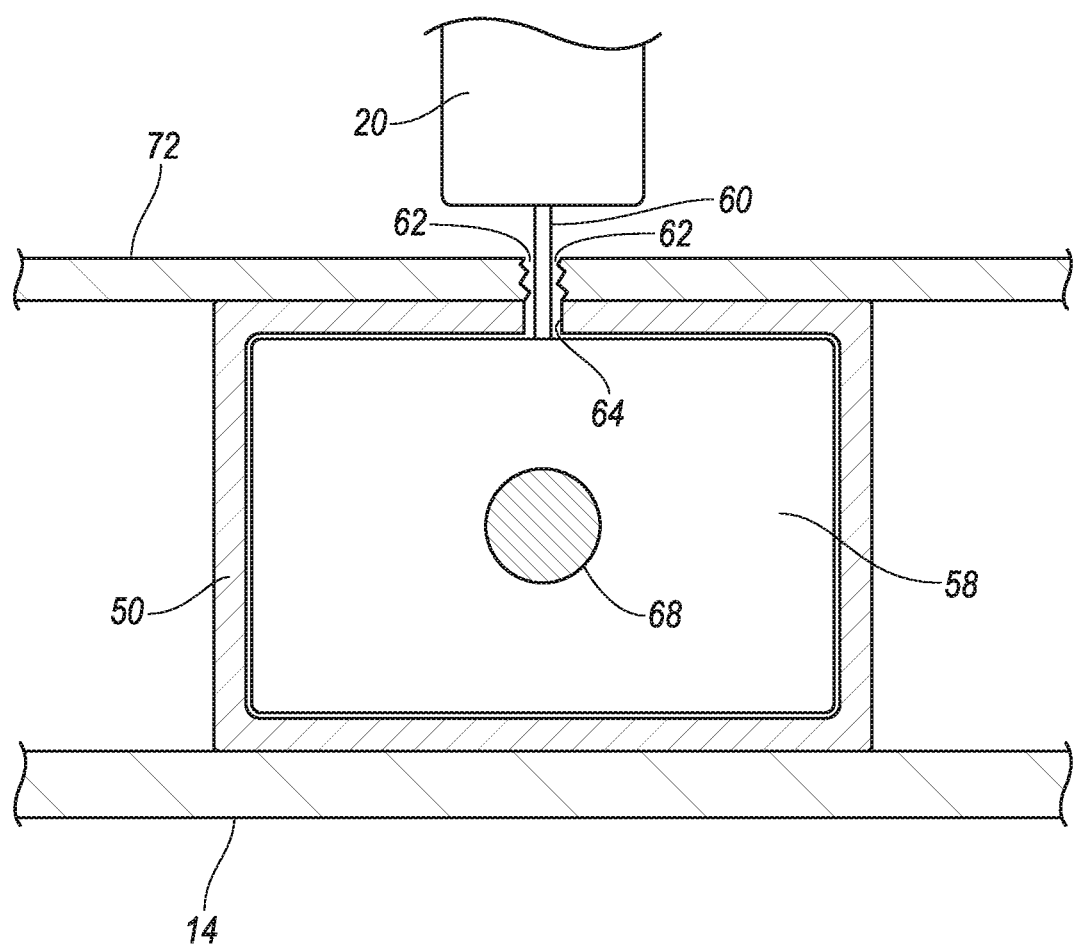
FIG. 7 is a cross-sectional view through line 7 in FIG. 5.

As shown in FIG. 7, the pyrotechnic device 66 may include a cable 68 connected to the slider 58. When the pyrotechnic device 66 is actuated in the event of an impact to the vehicle, the cable 68 is retracted toward the ends 56 of the vehicle-forward segment 52 and the vehicle-rearward segment 54 to move the sliders 58 along the vehicle-forward segment 52 and the vehicle-rearward segment 54 of the track 50 toward the ends 56 of the vehicle-forward segment 52 and the vehicle-rearward segment 54.

Figure 8:
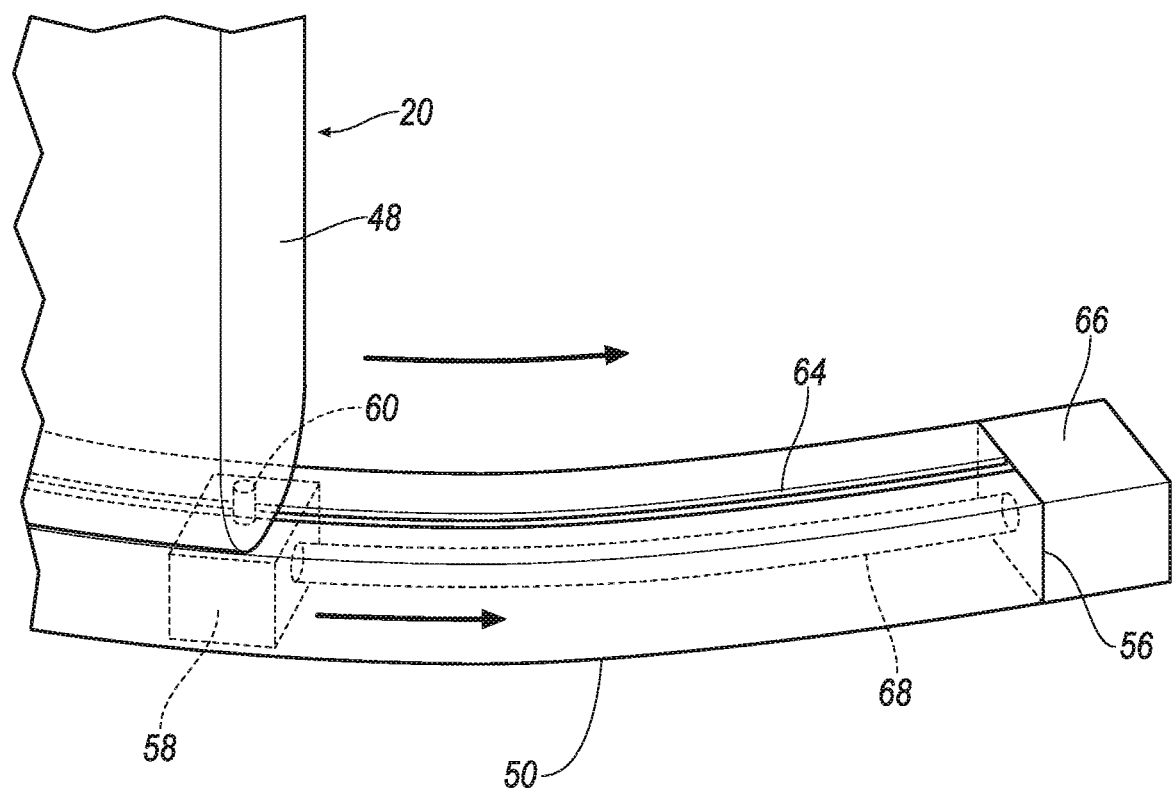
FIG. 8 is a perspective cut-out view of the track including a pyrotechnic device having a cable moving the airbag into the inflated position.

The pyrotechnic device 66 is on at least one of the track 50 of the vehicle floor 14 and the track 50 of the ceiling. In the example shown in FIG. 5, two pyrotechnic devices 66 are on the track 50 of the vehicle floor 14. In this example, the airbag 20 is movable along the track 50 of the vehicle floor 14 by the pyrotechnic devices 66. With reference to FIG. 8 and as indicated by arrows, the cable 68 of the pyrotechnic device 66 may move the slider 58 along the track 50 to move the airbag 20 along the track 50 to the inflated position.

The pyrotechnic device 66 may be rotary pretensioning devices, linear pretensioning devices, or any other suitable pyrotechnic device 66 to move the sliders 58 and airbag 20 along the tracks 50 toward the ends 56 of the track 50. The pyrotechnic device 66 includes a piston connected to the cable 68 and a pyrotechnic charge that moves the piston. The pyrotechnic charge may be combustible to produce a gas. The pyrotechnic charge may be formed of a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$).

The vehicle 12 may include impact sensors that may become activated in the event of an impact to the vehicle. The impact sensor may be in communication with the controller. The impact sensor is programmed to detect an impact to the vehicle. The impact sensor may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor may be located at numerous points in or on the vehicle.

The vehicle controller, implemented via circuits, chips, or other electronic components, is included in the vehicle control system for carrying out various operations, including as described herein. The vehicle controller is a computing device that generally includes a processor and a memory, the memory including one or more forms of computer-readable media, and storing instructions executable by the processor for performing various operations, including as disclosed herein. The memory of the vehicle controller further generally stores remote data received via various communications mechanisms; e.g., the vehicle controller is generally configured for communications on a controller area network (CAN) bus or the like, and/or for using other wired or wireless protocols, e.g., Bluetooth, etc. The vehicle controller may also have a connection to an onboard diagnostics connector (OBD-II). Via a communication network using Ethernet, WiFi, the CAN bus, Local Interconnect Network (LIN), and/or other wired or wireless mechanisms, the vehicle controller may transmit messages to various devices in the vehicle and/or receive messages from the various devices, e.g., controllers, actuators, sensors, etc., e.g., controllers and sensors as discussed herein. For example, the vehicle controller may receive data from vehicle sensors. Although one vehicle controller is shown in FIG. 1 for ease of illustration, it is to be understood that the vehicle controller could include, and various operations described herein could be carried out by, one or more computing devices.

In the event of an impact, the impact sensor may detect the impact and transmit a signal through the communications network to the vehicle controller. The vehicle controller may transmit a signal through the communications network to the inflator 42. The inflator 42 may discharge and inflate the airbag 20. In the example in the Figures, the pyrotechnic devices 66 may be actuated to begin to move the airbag 20 along the tracks 50. Tear seams 62 in the headliner 28 and/or carpet 72 may release to allow the airbag 20 to move along the track 50 as the airbag 20 inflates to the inflated position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
a vehicle floor and a vehicle roof spaced from the vehicle floor;
a pillar extending from the vehicle floor to the vehicle roof;
an airbag supported by the pillar, the airbag being inflatable from the pillar from an uninflated position to an inflated position; and
a seat supported by the vehicle floor adjacent the pillar, the airbag encircling the seat when in the inflated position.

2. The assembly of claim 1, wherein at least one of the vehicle roof or the vehicle floor includes a track, the airbag being engaged with and movable along the track.

3. The assembly of claim 2, wherein the airbag includes a vehicle-forward portion and a vehicle-rearward portion opposite the vehicle-forward portion, the vehicle-forward portion being movable along the track in an opposite direction of the vehicle-rearward portion.

4. The assembly of claim 3, wherein the vehicle-forward and the vehicle-rearward portions each have ends distal to the pillar, the ends overlapping each other when the airbag is in the inflated position.

5. The assembly of claim 3, wherein the track includes a vehicle-forward segment and a vehicle-rearward segment, the vehicle-forward portion of the airbag being engaged with and movable along the vehicle-forward segment and the vehicle-rearward portion of the airbag being engaged with and movable along the vehicle-rearward segment.

6. The assembly of claim 2, further comprising a pyrotechnic device connected to the airbag, the airbag being movable along the track by the pyrotechnic device.

7. The assembly of claim 2, further comprising a slider connected to the airbag, the slider engaged with and movable along the track.

8. The assembly of claim 2, wherein the seat is rotatable about a rotational axis and the track is curved about the rotational axis.

9. The assembly of claim 1, wherein the airbag is slidably engaged with at least one of the vehicle roof or the floor.

10. The assembly of claim 1, wherein the airbag has a generally cylindrical shape around the seat when in the inflated position.

11. The assembly of claim 1, wherein the airbag includes a vehicle-forward portion and a vehicle-rearward portion opposite the vehicle-forward portion.

12. The assembly of claim 11, wherein the vehicle-forward portion and the vehicle-rearward portion each have an end distal to the pillar, the ends overlapping each other when the airbag is in the inflated position.

13. The assembly of claim 1, wherein the pillar includes a trim panel and a body panel, the airbag being disposed between the trim panel and the body panel in the uninflated position.

14. The assembly of claim 1, wherein the vehicle roof and the vehicle floor each includes a track, the airbag being engaged with and movable along the tracks.

15. The assembly of claim 14, wherein each track includes a vehicle-forward segment and a vehicle-rearward segment spaced from each other, and the airbag includes a vehicle-forward portion engaged with and movable along the vehicle-forward segments and a vehicle-rearward portion engaged with and movable along the vehicle-rearward segments.

16. The assembly of claim 15, wherein the vehicle-forward and the vehicle-rearward portions of the airbag each have ends distal to the pillar, the ends overlapping each other when the airbag is in the inflated position.

17. The assembly of claim 15, further comprising a pyrotechnic device at the vehicle floor and connected to the airbag, the airbag being movable along the track of the vehicle floor by the pyrotechnic device.

18. The assembly of claim 1, wherein the airbag is inflatable from the pillar vehicle-forward and vehicle-rearward of the seat.

19. An assembly, comprising:
a vehicle floor and a vehicle roof spaced from the vehicle floor;
a pillar extending from the vehicle floor to the vehicle roof;
an airbag supported by the pillar, the airbag being inflatable from the pillar from an uninflated position to an inflated position;
the airbag including a vehicle-forward portion and a vehicle-rearward portion opposite the vehicle-forward portion, the vehicle-forward portion being inflatable from an opposite direction from the vehicle-rearward portion around the seat;
the vehicle-forward portion and the vehicle-rearward portion each having an end distal to the pillar, the ends overlapping each other when the airbag is in the inflated position;
a seat supported by the vehicle floor adjacent the pillar, the airbag extending around the seat when in the inflated position.

20. An assembly, comprising:
a vehicle floor and a vehicle roof spaced from the vehicle floor;
a pillar extending from the vehicle floor to the vehicle roof;
an airbag supported by the pillar, the airbag being inflatable from the pillar from an uninflated position to an inflated position; and
a seat supported by the vehicle floor adjacent the pillar, the airbag extending around the seat when in the inflated position;
the vehicle roof and the vehicle floor each including a track, the airbag being engaged with and movable along the tracks.

* * * * *